US012687990B2

(12) United States Patent
Kaneko et al.

(10) Patent No.: US 12,687,990 B2
(45) Date of Patent: Jul. 21, 2026

(54) INFORMATION PROCESSING APPARATUS, METHOD FOR CONTROLLING INFORMATION PROCESSING APPARATUS, AND PRINTING SYSTEM

(71) Applicant: SEIKO EPSON CORPORATION, Tokyo (JP)

(72) Inventors: Naohiro Kaneko, Matsumoto (JP); Hiroshi Kaiho, Matsumoto (JP); Hideaki Kitazawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 345 days.

(21) Appl. No.: 18/349,539

(22) Filed: Jul. 10, 2023

(65) Prior Publication Data

US 2024/0020068 A1 Jan. 18, 2024

(30) Foreign Application Priority Data

Jul. 13, 2022 (JP) ................................. 2022-112578

(51) Int. Cl.
*G06F 3/12* (2006.01)

(52) U.S. Cl.
CPC .............. *G06F 3/121* (2013.01); *G06F 3/126* (2013.01); *G06F 3/1273* (2013.01); *G06F 3/1285* (2013.01)

(58) Field of Classification Search
CPC ........ G06F 3/121; G06F 3/126; G06F 3/1273; G06F 3/1285; G06F 3/1234
See application file for complete search history.

(56) References Cited

U.S. PATENT DOCUMENTS

| 2003/0063913 A1* | 4/2003 | Yamazaki | .............. G03G 15/55 |
| | | | 399/8 |
| 2012/0044531 A1* | 2/2012 | Sakai | ................. H04N 1/00954 |
| | | | 358/1.15 |
| 2016/0216175 A1* | 7/2016 | Iwasaki | ................. G06F 11/008 |

FOREIGN PATENT DOCUMENTS

| CN | 109120925 A | * | 1/2019 | ............. H04N 17/04 |
| JP | 2006-150797 A | | 6/2006 | |
| JP | 2008097512 | | 4/2008 | |
| JP | 2011237576 | | 11/2011 | |
| JP | 2017123521 A | * | 7/2017 | |

* cited by examiner

*Primary Examiner* — Huo Long Chen
(74) *Attorney, Agent, or Firm* — WORKMAN NYDEGGER

(57) ABSTRACT

A server apparatus is connected to a printer in a communicable manner. The printer includes a first printer and other printers. The server apparatus includes a first acquisition section that acquires, when an error occurs in the first printer, error occurrence information indicating that the error has occurred from the first printer, a second acquisition section that acquires, when the error occurrence information is acquired, a first action log indicating the printing action of the first printer, and a normal action log indicating the printing actions of the other printers, which perform the printing actions normally, a comparator that compares the first action log with the normal action log, and an estimator that estimates an item relating to the error from the items contained in the first action log based on the result of the comparison performed by the comparator.

5 Claims, 7 Drawing Sheets

Figure 4:
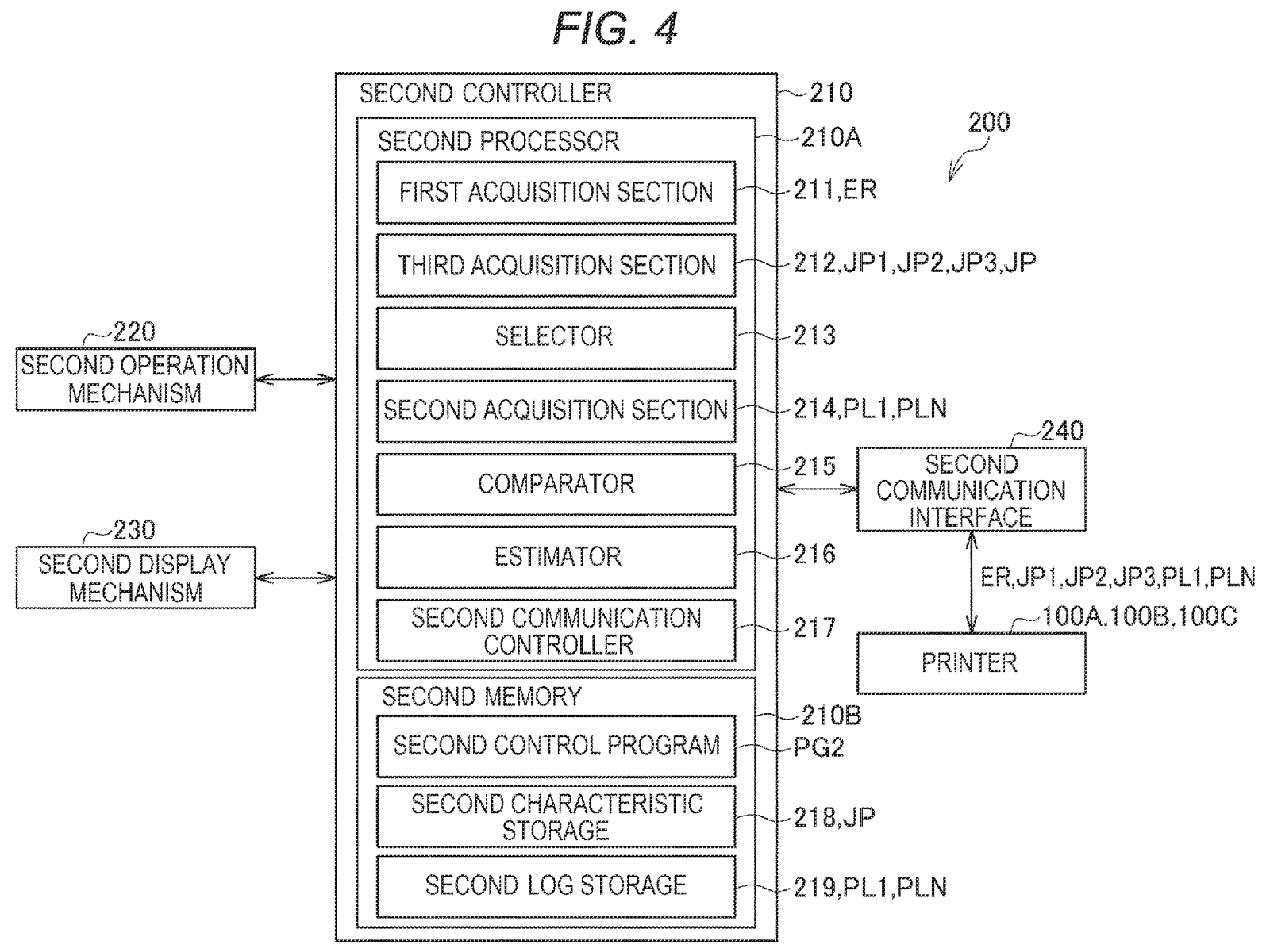

SECOND CONTROLLER — 210

SECOND PROCESSOR — 210A

FIRST ACQUISITION SECTION — 211,ER

THIRD ACQUISITION SECTION — 212,JP1,JP2,JP3,JP

SELECTOR — 213

SECOND ACQUISITION SECTION — 214,PL1,PLN

COMPARATOR — 215

ESTIMATOR — 216

SECOND COMMUNICATION CONTROLLER — 217

SECOND MEMORY — 210B

SECOND CONTROL PROGRAM — PG2

SECOND CHARACTERISTIC STORAGE — 218,JP

SECOND LOG STORAGE — 219,PL1,PLN

SECOND COMMUNICATION INTERFACE — 240

PRINTER

ER,JP1,JP2,JP3,PL1,PLN
100A,100B,100C

SECOND OPERATION MECHANISM — 220

SECOND DISPLAY MECHANISM — 230

Figure 5:
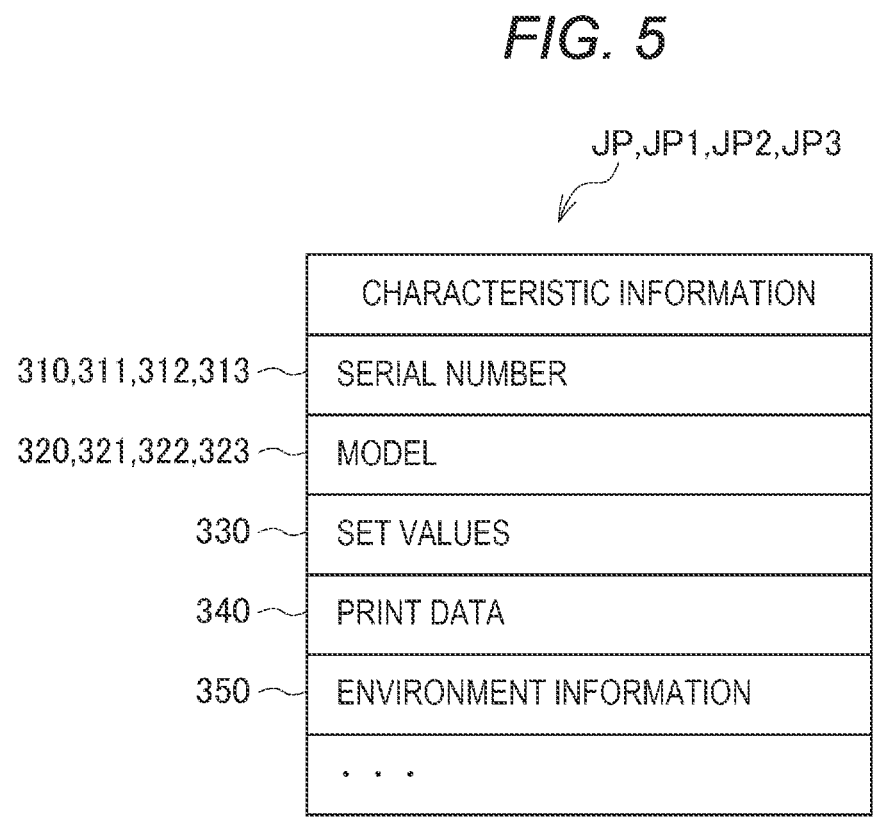

| CHARACTERISTIC INFORMATION |
| --- |
| SERIAL NUMBER |
| MODEL |
| SET VALUES |
| PRINT DATA |
| ENVIRONMENT INFORMATION |
| . . . |

310,311,312,313 — SERIAL NUMBER 320,321,322,323 — MODEL

330 — SET VALUES

340 — PRINT DATA

350 — ENVIRONMENT INFORMATION

PL1,PLN

LOG ITEMS

410 — ■ SEQUENCE LOG

420 — ■ MEMORY LOG

430 — ■ DETAIL LOG   431 — 1) PID CONTROL LOG

432 — 2) ATC LOG / ATC-PI CONTROL LOG

433 — 3) WINDING CONTROL LOG

434 — 4) TENSION LOG

435 — 5) COLORIMETRIC ADJUSTMENT LOG

440 — ■ CONTROL-RELATED MEMORY LOG

INFORMATION PROCESSING APPARATUS, METHOD FOR CONTROLLING INFORMATION PROCESSING APPARATUS, AND PRINTING SYSTEM

The present application is based on, and claims priority from JP Application Serial Number 2022-112578, filed Jul. 13, 2022, the disclosure of which is hereby incorporated by reference herein in its entirety.

BACKGROUND

1. Technical Field

The present disclosure relates to an information processing apparatus, a method for controlling the information processing apparatus, and a printing system.

2. Related Art

There have been known technologies for handling printer errors.

For example, JP-A-2006-150797 describes comparison of the operation sound of a printer with the operation sound produced when the printer is operating normally or when the printer is operating abnormally.

The technology described in JP-A-2006-150797 can estimate whether a printer is operating normally or abnormally, but has a difficulty in estimating the cause of an error.

SUMMARY

An aspect for solving the problem described above relates to an information processing apparatus connected to a printing apparatus in a communicable manner, the printing apparatus including a first printing apparatus and another printing apparatus, the information processing apparatus including a first acquisition section that, when an error occurs in the first printing apparatus, acquires error occurrence information indicating that the error occurred from the first printing apparatus, a second acquisition section that, when the error occurrence information is acquired, acquires a first action log indicating a printing action of the first printing apparatus and a normal action log indicating a printing action of the other printing apparatus, which performs the printing action normally, a comparator that compares the first action log with the normal action log, and an estimator that estimates an item relating to the error from items contained in the first action log based on a result of the comparison performed by the comparator.

Another aspect for solving the problem described above relates to a method for controlling an information processing apparatus connected to a printing apparatus in a communicable manner, the printing apparatus including a first printing apparatus and another printing apparatus, the method including a first acquisition step of acquiring, when an error occurs in the first printing apparatus, error occurrence information indicating that the error occurred from the first printing apparatus, a second acquisition step of acquiring, when the error occurrence information is acquired, a first action log indicating a printing action of the first printing apparatus and a normal action log indicating a printing action of the other printing apparatus, which performs the printing action normally, a comparison step of comparing the first action log with the normal action log, and an estimation step of estimating an item relating to the error from items contained in the first action log based on a result of the comparison in the comparison step.

Still another aspect for solving the problem described above relates to a printing system including a printing apparatus, and an information processing apparatus connected to the printing apparatus in a communicable manner, the printing apparatus including a first printing apparatus and another printing apparatus, and the information processing apparatus including a first acquisition section that, when an error occurs in the first printing apparatus, acquires error occurrence information indicating that the error occurred from the first printing apparatus, a second acquisition section that, when the error occurrence information is acquired, acquires a first action log indicating a printing action of the first printing apparatus and a normal action log indicating a printing action of the other printing apparatus, which performs the printing action normally, a comparator that compares the first action log with the normal action log, and an estimator that estimates an item relating to the error from items contained in the first action log based on a result of the comparison performed by the comparator.

BRIEF DESCRIPTION OF THE DRAWINGS

FIG. 4 shows an example of the configuration of a server apparatus according to the embodiment.

FIG. 5 is a table showing an example of characteristic information.

DESCRIPTION OF EXEMPLARY EMBODIMENTS

An embodiment according to the present disclosure will be described below with reference to the drawings.

1. Overall Configuration of Printing System

Figure 1:
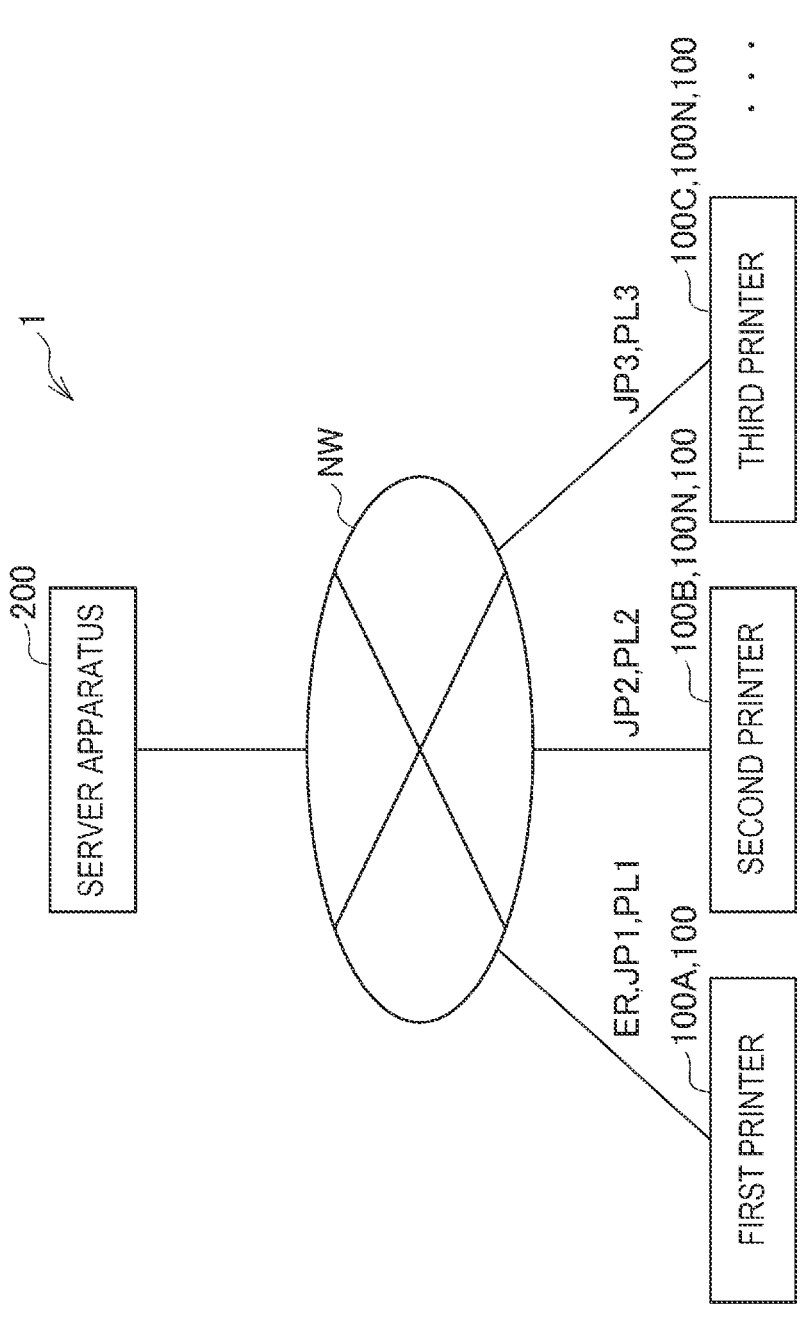
FIG. 1 shows an example of the configuration of a printing system according to an embodiment of the present disclosure.

FIG. 1 shows an example of the configuration of a printing system 1 according to the present embodiment.

The printing system 1 includes a printer 100 and a server apparatus 200. The printer 100 includes a first printer 100A and other printers 100N. The other printers 100N are printers that differ from the first printer 100A and include a second printer 100B and a third printer 100C. That is, the printer 100 includes the first printer 100A, the second printer 100B, and the third printer 100C.

The first printer 100A, the second printer 100B, and the third printer 100C are each communicably connected to the server apparatus 200 via a network NW. The network NW is, for example, a wide area network (WAN).

The first printer 100A, the second printer 100B, and the third printer 100C have substantially the same configurations. Therefore, in the following description, the first printer 100A, the second printer 100B, and the third printer 100C are referred to as the printer 100 in some cases when the first printer 100A, the second printer 100B, and the third printer 100C are not distinguished from each other.

The printer 100 corresponds to an example of a "printing apparatus". The first printer 100A corresponds to an example of a "first printing apparatus". The second printer 100B and the third printer 100C each correspond to an example of "another printing apparatus". The second printer 100B corresponds to an example of a "second printing apparatus". The third printer 100C corresponds to an example of a "third printing apparatus".

The printer 100 prints an image on a recording medium M. The present embodiment will be described with reference to a case where the printer 100 is, for example, what is called a large-format inkjet printer. The printer 100 transmits error occurrence information ER to the server apparatus 200 when an error occurs. The printer 100 also transmits characteristic information JP and an action log PL to the server apparatus 200. The characteristic information JP represents the characteristics of the printer 100. The action log PL is a log of the printing action of the printer 100.

The present embodiment will be described with reference to a case where an error occurs in the first printer 100A and the second printer 100B and the third printer 100C operate normally.

Figure 2:
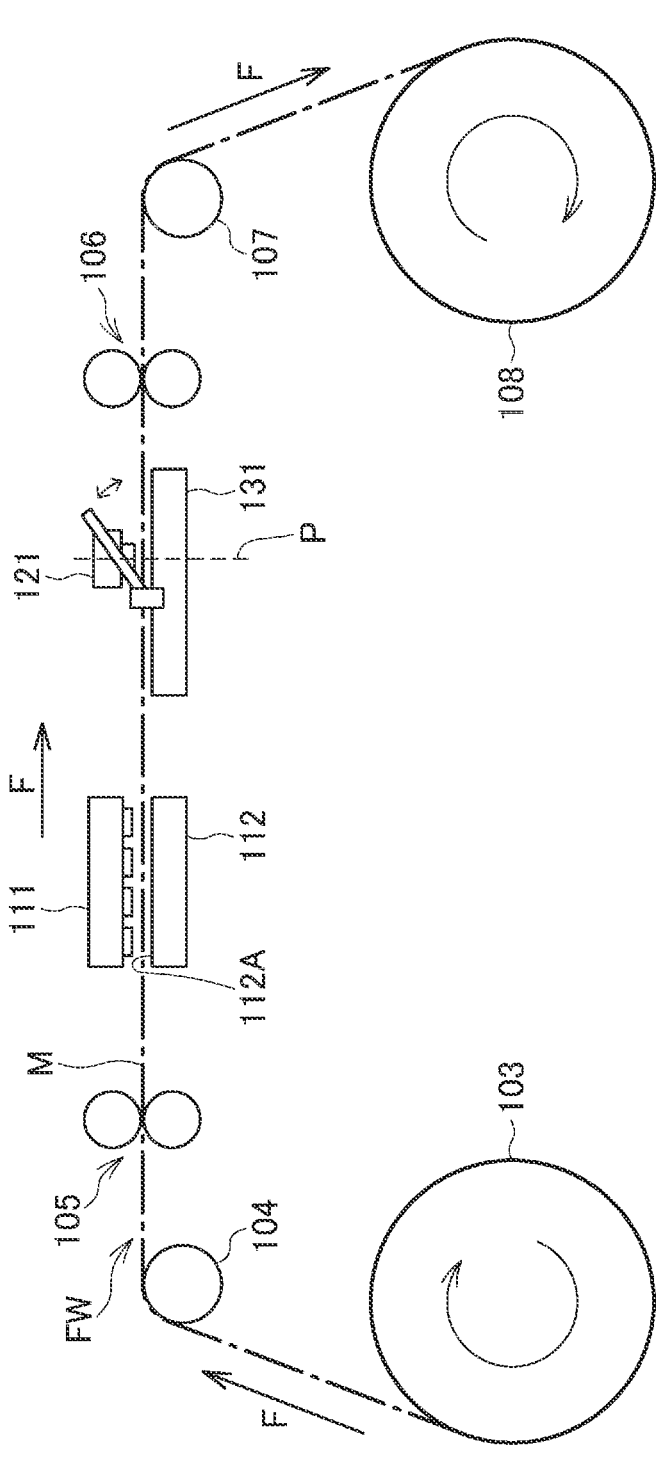
FIG. 2 is a side view showing an example of the configuration of a printer according to the embodiment.

The printer 100 will be further described with reference to FIGS. 2 and 3.

The characteristic information JP will be further described with reference to FIG. 5. The characteristic information JP on the characteristics of the first printer 100A is called first characteristic information JP1, the characteristic information JP on the characteristics of the second printer 100B is called second characteristic information JP2, and the characteristic information JP on the characteristics of the third printer 100C is called third characteristic information JP3.

The action log PL will be further described with reference to FIG. 6. The action log PL of the action of the first printer 100A is called a first action log PL1, the action log PL of the action of the second printer 100B is called a second action log PL2, and the action log PL of the action of the third printer 100C is called a third action log PL3.

When the server apparatus 200 receives the error occurrence information ER from the printer 100, the server apparatus 200 acquires the characteristic information JP and the action log PL from the printer 100.

The server apparatus 200 corresponds to an example of an "information processing apparatus".

The present embodiment will be described with reference to a case where the server apparatus 200 receives the error occurrence information ER from the first printer 100A.

The present embodiment will be described with reference to, but not limited to, a case where the server apparatus 200 is connected to the first printer 100A, the second printer 100B, and the third printer 100C via an Ethernet (registered trademark) cable or any other component for wired communication. The server apparatus 200 may instead be connected to the first printer 100A, the second printer 100B, and the third printer 100C via Wi-Fi (registered trademark) for wireless communication.

The present embodiment will be described with reference to, but not limited to, a case where the network NW is an WAN. The network NW may, for example, be the Internet or a local area network (LAN).

2. Configuration of Printer

The configuration of the printer 100 will next be described with reference to FIG. 2. FIG. 2 is a side view showing an example of the configuration of the printer 100 according to the present embodiment.

The printer 100 is a large-format inkjet printer that discharges inks onto the recording medium M to form an image on the printing receiving surface of the recording medium M.

The printer 100 includes a print head 111, which discharges inks onto the recording medium M. The printer 100 performs color printing by discharging a plurality of color inks from the print head 111. For example, the print head 111 discharges five color inks, yellow, magenta, cyan, black, and white inks, from different nozzles. The number of ink colors used by the printer 100 is not limited to a specific number. A platen 112 is disposed at a position where the print head 111 faces the platen 112. The platen 112 has a planar support surface 112A, which supports the recording medium M at the position facing the print head 111.

The recording medium M is not restricted to a specific medium, and may be any medium in the form of a sheet. For example, the recording medium M can be a paper sheet, a synthetic resin sheet, and a woven fabric sheet. The recording medium M may be a cut sheet cut in accordance with a standard size, and the present embodiment will be described with reference to a configuration using an elongated recording medium M.

The printer 100 includes a feed roller 103, around which the recording medium M is wound. The printer 100 includes a conveyance roller 105, which conveys the recording media M fed from the feed roller 103, and a conveyance roller 106.

The conveyance rollers 105 and 106 are each formed of a pair of rollers that nip the recording medium M and send the recording medium M in a conveyance direction F. The recording medium M printed by the print head 111 is wound around the winding roller 108. The conveyance rollers 105 and 106 are driven by a conveyance motor that is not shown. The feed roller 103 and the winding roller 108 are driven by the conveyance motor or any other motor.

The conveyance rollers 105 and 106 are disposed along a conveyance path FW, along which the recording medium M is conveyed in the printer 100, and convey the recording medium M in the conveyance direction F under the control of a first controller 160, which will be described later with reference to FIG. 3. The printer 100 includes a relay roller 104, which guides the recording medium M fed from the feed roller 103 to the conveyance roller 105, and a relay roller 107, which guides the recording medium M to the winding roller 108. The relay roller 104 may be formed of a plurality of rollers. The same holds true for the relay roller 107.

The printer 100 has a colorimeter 121, which measures the colors of the recording medium M printed by the print head 111. The colorimeter 121 is located downstream from the print head 111 in the conveyance direction F and measures the colors of the printed image formed on the print surface of the recording medium M with the inks discharged by the print head 111.

A configuration for fixing the inks may be provided between the print head 111 and the colorimeter 121. For example, when the printer 100 uses UV inks cured by UV light to perform the printing, a UV radiator may be disposed downstream from the print head 111 in the conveyance direction F. In this case, the colorimeter 121 is disposed downstream from the UV radiator. The printer 100 may also include an ink dryer disposed downstream from the print head 111. In this case, the colorimeter 121 is disposed downstream from the dryer.

In the present embodiment, the position at which the colorimeter 121 performs the colorimetry is called a colorimetry position P. The colorimetry position P indicates a position in the conveyance direction F. In FIG. 2, the colorimetry position P is located downstream from the print head 111 but upstream from the conveyance roller 106 in the conveyance direction F.

In the direction perpendicular to the support surface 112A of the platen 112, the side facing the print head 111 with respect to the recording medium M is called the upper side of the conveyance path FW. Each portion of the colorimeter 121 is disposed above the conveyance path FW and faces the surface of the recording medium M onto which the print head 111 discharges inks.

The colorimeter 121 is disposed so as to face a support member 131. The support member 131 is located on the side of the recording medium M opposite from the colorimeter 121, that is, below the conveyance path FW. The support member 131 has a planar upper surface, and the upper surface of the support member 131 supports the recording medium M.

The configuration of a first control apparatus 150 of the printer 100 will next be described with reference to FIG. 3. FIG. 3 shows an example of the configuration of the first control apparatus 150 of the printer 100.

The printer 100 includes the first control apparatus 150. The first control apparatus 150 includes the first controller 160, a first operation mechanism 170, a first display mechanism 180, and a first communication interface 190. The first controller 160 includes a first processor 160A and a first memory 160B. The first controller 160 controls the action of each of the portions of the printer 100 shown in FIG. 2. The print head 111, the colorimeter 121, and a variety of motors that are not shown are connected to the first controller 160.

For example, the print head 111 discharges inks to form a printed image on the recording medium M in accordance with an instruction from the first controller 160.

Furthermore, for example, the colorimeter 121 performs colorimetry via a colorimetric device that is not shown and outputs color values to the first controller 160 in accordance with an instruction from the first controller 160.

The first processor 160A is formed, for example, of a central processing unit (CPU), a digital signal processor (DSP), or a microcomputer. The first processor 160A may be formed of a plurality of processors or a single processor.

The first processor 160A may be hardware programmed to achieve the functions of the portions that will be described later. That is, the first processor 160A may be configured to incorporate a first control program PG1 as a hardware circuit. In this case, for example, the first processor 160A is formed of an application specific integrated circuit (ASIC), a field programmable gate array (FPGA), or any other component.

The following description will be made with reference to a case where the first processor 160A executes the first control program PG1 to achieve the variety of functions of the first controller 160.

The first memory 160B has a storage region where programs executed by the first processor 160A and data processed by the first processor 160A are stored. The first memory 160B stores the first control program PG1 executed by the first processor 160A, set data including a variety of set values relating to the printing action of the printer 100, and other pieces of information.

The first memory 160B has a nonvolatile storage region where the programs and the data are stored in a nonvolatile manner. The first memory 160B may include, for example, a read only memory (ROM), a hard disk drive (HDD), or a solid-state drive (SSD) as the nonvolatile storage region. The first memory 160B may further has a volatile storage region to constitute a work area where the programs to be executed and the data to be processed by the first processor 160A are temporarily stored. The first memory 160B may include, for example, a random access memory (RAM) as the volatile storage region.

The first operation mechanism 170, the first display mechanism 180, and the first communication interface 190 are coupled to the first controller 160.

A variety of sensors that detect the printing action of the printer 100 are further coupled to the first controller 160. For example, a remaining quantity sensor that detects the remaining quantity of the recording medium M wound around the feed roller 103, a medium sensor that detects whether the recording medium M is present or not at detection positions upstream and downstream from the platen 112, and other sensors are coupled to the first controller 160. A variety of sensors that detect whether any of the nozzles of the print head 111 is clogged may further be coupled to the first controller 160.

The first operation mechanism 170 includes a variety of keys, buttons, and other components, and accepts operation from a user (operator of printer 100, for example). The first operation mechanism 170 then generates an operation signal corresponding to the accepted operation and outputs the generated operation signal to the first controller 160.

The first display mechanism 180 includes a liquid crystal display (LCD) or any other device and displays a variety of images on the LCD in accordance with instructions from the first controller 160.

The first communication interface 190 includes a connector and an interface circuit and is coupled to the first controller 160. In the present embodiment, the first communication interface 190 is an interface for communication with the server apparatus 200 in compliance, for example, with the Ethernet (registered trademark) standard.

Figure 3:
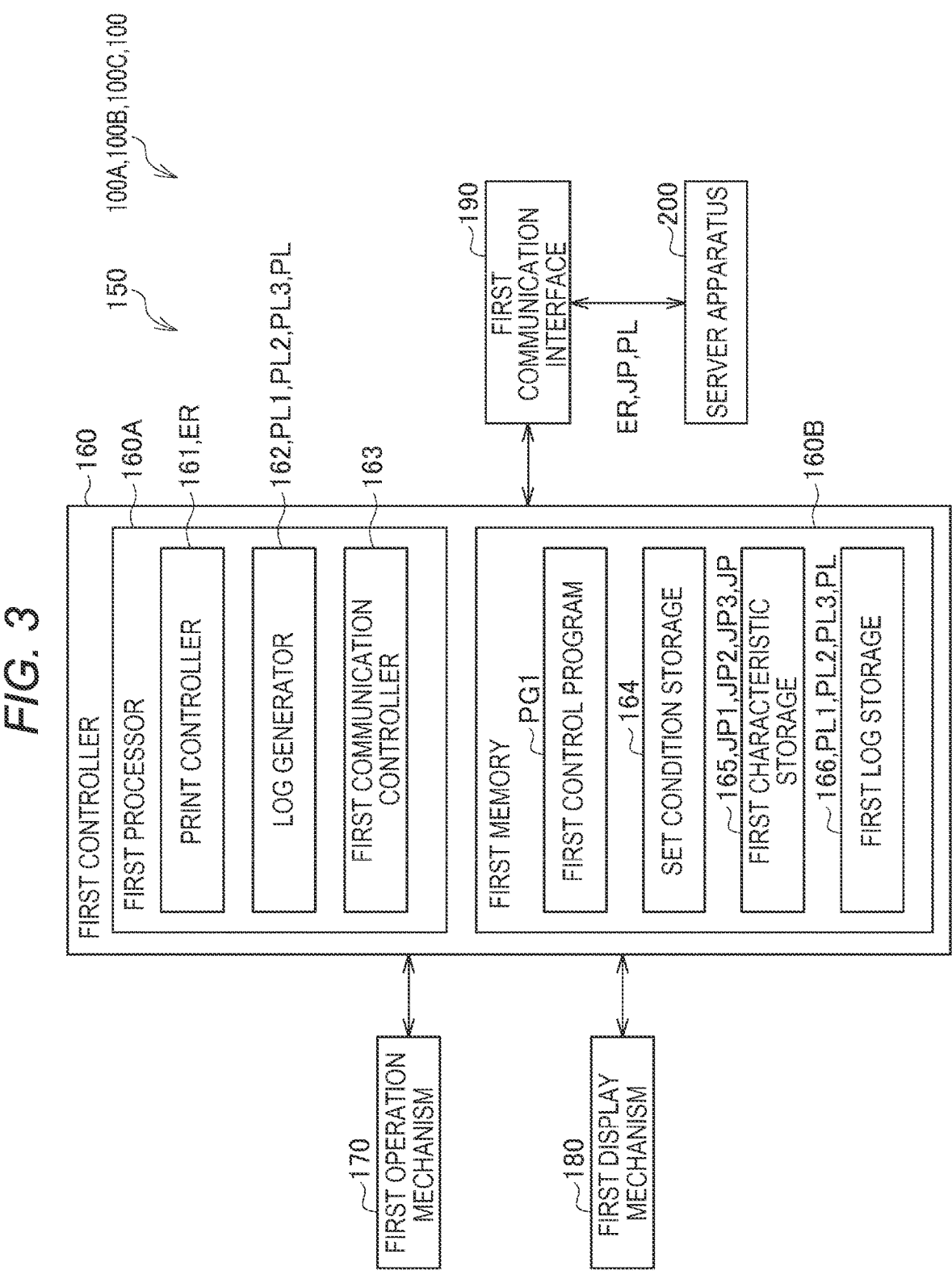
FIG. 3 shows an example of the configuration of a first control apparatus of the printer.

The first controller 160 includes a print controller 161, a log generator 162, a first communication controller 163, a set condition storage 164, a first characteristic storage 165, and a first log storage 166, as shown in FIG. 3. The portions described above are each achieved, for example, by the first processor 160A that executes the first control program PG1 through cooperation between software and hardware.

The set condition storage 164 stores set conditions. The set conditions include set values to be set in the portions of the printer 100, and data on an image to be printed. The set conditions are read from the set condition storage 164 by the print controller 161 and set in the portions of the printer 100.

The first characteristic storage 165 stores the characteristic information JP. The characteristic information JP represents the characteristics of the printer 100. The characteristic information JP contains the first characteristic information JP1, the second characteristic information JP2, and the third characteristic information JP3.

The first characteristic storage 165 of the first printer 100A stores the first characteristic information JP1. The first characteristic information JP1 represents the characteristics of the first printer 100A. The first characteristic storage 165 of the second printer 100B stores the second characteristic information JP2. The second characteristic information JP2 represents the characteristics of the second printer 100B. The first characteristic storage 165 of the third printer 100C stores the third characteristic information JP3. The third characteristic information JP3 represents the characteristics of the third printer 100C.

The characteristic information JP will be described with reference to FIG. 5. FIG. 5 is a table showing an example of the characteristic information JP. The characteristic information JP contains a serial number 310, a model 320, set values 330, print data 340, and environment information 350, as shown in FIG. 5.

The serial number 310 is the serial number of the printer 100. In other words, the serial number 310 is information for identification of the printer 100. The serial number 310 is assigned in accordance with the date and time when the printer 100 was manufactured. The serial number 310 indicates the lot in which the printer 100 was manufactured. The serial number 310 is stored in the first characteristic storage 165, for example, when the printer 100 was manufactured.

The model 320 is the model of the printer 100. The model 320 indicates the specifications of the hardware and software that constitute the printer 100. The model 320 is stored in the first characteristic storage 165 when the printer 100 was manufactured.

The model 320 is expressed, for example, by eight alphanumeric digits. The model 320 is expressed, for example, by four-digit alphabetic letters and four-digit numbers. The four-digit alphabetic letters that constitute the model 320 represent, for example, the application and type of the printer 100. The four-digit numbers that constitute the model 320 represent the version of the printer 100. As the four-digit numbers that constitute the model 320, for example, a larger number is assigned to a printer 100 having a newer version.

In the present embodiment, the models 320 of the first printer 100A, the second printer 100B, and the third printer 100C have the same four-digit alphabetic letters. The models 320 of the first printer 100A, the second printer 100B, and the third printer 100C have four-digit numbers different from each other.

The set values 330 are read from the set condition storage 164 by the print controller 161 and set in the portions of the printer 100. The set values 330 are updated whenever set in the portions of the printer 100 by the print controller 161. The set values 330, for example, specify the actions of the portions of the printer 100. The set values 330 include, for example, a set value of the speed at which the recording medium M is conveyed by the conveyance rollers 105 and 106, a set value of the tension of the recording medium M between the conveyance rollers 105 and 106, and a set value of the tension of the recording medium M between the relay roller 107 and the winding roller 108.

The print data 340 are read from the set condition storage 164 by the print controller 161 and set in the print head 111. The print data 340 are updated whenever set in the print head 111 by the print controller 161. The print data 340 include, for example, the size of an image to be printed and the position where the image is printed on the recording medium M.

The environment information 350 represents the state of the environment in which the printer 100 is installed. The environment information 350 includes, for example, information on the temperature and humidity at the location where the printer 100 is installed. The temperature information is acquired by the first controller 160 via a temperature sensor located at the periphery of the printer 100 and stored in the first characteristic storage 165. The humidity information is acquired by the first controller 160 via a humidity sensor located at the periphery of the printer 100 and stored in the first characteristic storage 165.

In the following description, the serial number 310 of the first printer 100A is called a first number 311, the serial number 310 of the second printer 100B is called a second number 312, and the serial number 310 of the third printer 100C is called a third number 313. The model 320 of the first printer 100A is called a first model 321, the model 320 of the second printer 100B is called a second model 322, and the model 320 of the third printer 100C is called a third model 323.

Referring back again to FIG. 3, the configuration of the first controller 160 will be described.

The first log storage 166 stores the action log PL. The action log PL is generated by the log generator 162, and the generated action log PL is stored in the first log storage 166. The action log PL includes a first action log PL1, a second action log PL2, and a third action log PL3.

The first log storage 166 of the first printer 100A stores the first action log PL1. The first action log PL1 is generated by the log generator 162 of the first printer 100A. The first log storage 166 of the second printer 100B stores the second action log PL2. The second action log PL2 is generated by the log generator 162 of the second printer 100B. The first log storage 166 of the third printer 100C stores the third action log PL3. The third action log PL3 is generated by the log generator 162 of the third printer 100C.

The print controller 161 reads the set conditions stored in the set condition storage 164 and sets the read conditions in the portions of the printer 100. The print controller 161 then causes the printer 100 to perform the printing action. When an error occurs in the printer 100, the print controller 161 generates the error occurrence information ER and transmits the generated error occurrence information ER to the server apparatus 200. The error occurrence information ER indicates that an error has occurred. The error occurrence information ER may also contain information representing at least one of the type and content of the error having occurred.

The log generator 162 generates the action log PL, which is a log of the printing action of the printer 100. The log generator 162 generates the action log PL, for example, on a regular basis. Instead, the log generator 162 generates the action log PL, for example, in response to an instruction from the server apparatus 200.

The log generator 162 causes the first log storage 166 to store the generated action log PL. The log generator 162 transmits the action log PL to the server apparatus 200 in response to an instruction from the server apparatus 200.

The action log PL will be further described with reference to FIG. 6.

The first communication controller 163 controls communication with the server apparatus 200 via the first communication interface 190. The first communication controller 163 transmits, for example, the error occurrence information ER, the characteristic information JP, and the action log PL to the server apparatus 200.

3. Configuration of Server Apparatus

The configuration of the server apparatus 200 will next be described with reference to FIG. 4. FIG. 4 shows an example of the configuration of the server apparatus 200 according to the present embodiment. The server apparatus 200 includes a second controller 210, a second operation mechanism 220, a second display mechanism 230, and a second communication interface 240, as shown in FIG. 4. The second controller 210 includes a second processor 210A and a second memory 210B. The second controller 210 controls the action of each of the portions of the server apparatus 200.

The second processor 210A is formed, for example, of a CPU, a DSP, or a microcomputer. The second processor 210A may be formed of a plurality of processors or a single processor.

The second processor 210A may be hardware programmed to achieve the functions of the portions that will be described later. That is, the second processor 210A may be configured to incorporate a second control program PG2 as a hardware circuit. In this case, for example, the second processor 210A is formed of an ASIC, an FPGA, or any other component.

The following description will be made with reference to a case where the second processor 210A executes the second control program PG2 to achieve the variety of functions of the second controller 210.

The second memory 210B has a storage region where programs executed by the second processor 210A and data processed by the second processor 210A are stored. The second memory 210B stores the second control program PG2 executed by the second processor 210A, a variety of image data relating to the actions of the server apparatus 200, set data, and other pieces of information.

The second memory 210B has a nonvolatile storage region where the programs and the data are stored in a nonvolatile manner. The second memory 210B may include, for example, a ROM, an HDD, or an SSD as the nonvolatile storage region. The second memory 210B may further has a volatile storage region to constitute a work area where programs to be executed by the second processor 210A and the data to be processed by the second processor 210A are temporarily stored. The second memory 210B may include, for example, a RAM as the volatile storage region.

The second operation mechanism 220, the second display mechanism 230, and the second communication interface 240 are coupled to the second controller 210.

The second operation mechanism 220 includes a variety of keys, buttons, and other components, and accepts operation from the user (administrator of server apparatus 200, designer of printer 100, and person in charge of maintenance of printer 100, for example). The second operation mechanism 220 then generates an operation signal corresponding to the accepted operation and outputs the generated operation signal to the second controller 210.

The second display mechanism 230 includes an LCD or any other device and displays a variety of images on the LCD in accordance with instructions from the second controller 210.

The second communication interface 240 includes a connector and an interface circuit and is coupled to the second controller 210. In the present embodiment, the second communication interface 240 is an interface for communication with the first printer 100A, the second printer 100B, and the third printer 100C in compliance, for example, with the Ethernet (registered trademark) standard. The second controller 210 includes a first acquisition section 211, a third acquisition section 212, a selector 213, a second acquisition section 214, a comparator 215, an estimator 216, a second communication controller 217, a second characteristic storage 218, and a second log storage 219, as shown in FIG. 4. The portions described above are each achieved, for example, by the second processor 210A that executes the second control program PG2 through cooperation between software and hardware.

The second characteristic storage 218 stores the first characteristic information JP1, the second characteristic information JP2, and the third characteristic information JP3. The first characteristic information JP1 is acquired from the first printer 100A by the third acquisition section 212 and stored in the second characteristic storage 218. The second characteristic information JP2 is acquired from the second printer 100B by the third acquisition section 212 and stored in the second characteristic storage 218. The third characteristic information JP3 is acquired from the third printer 100C by the third acquisition section 212 and stored in the second characteristic storage 218.

The second log storage 219 stores the action log PL. The action log PL includes the first action log PL1 and a normal action log PLN. The first action log PL1 is acquired from the first printer 100A by the second acquisition section 214 and stored in the second log storage 219.

The normal action log PLN is the action log PL of the normally operating printer 100. In the present embodiment, the normal action log PLN is the second action log PL2 or the third action log PL3. The second action log PL2 is acquired from the second printer 100B by the second acquisition section 214 and stored in the second log storage 219. The third action log PL3 is acquired from the third printer 100C by the second acquisition section 214 and stored in the second log storage 219.

When an error occurs in the first printer 100A, the first acquisition section 211 acquires the error occurrence information ER, which indicates that the error has occurred, from the first printer 100A.

The third acquisition section 212 acquires the first characteristic information JP1 from the first printer 100A, acquires the second characteristic information JP2 from the second printer 100B, and acquires the third characteristic information JP3 from the third printer 100C. The third acquisition section 212 then causes the second characteristic storage 218 to store the first characteristic information JP1, the second characteristic information JP2, and the third characteristic information JP3.

Based on the first characteristic information JP1, the second characteristic information JP2, and the third characteristic information JP3, the selector 213 selects the printer 100 from which the second acquisition section 214 acquires the normal action log PLN from the second printer 100B and the third printer 100C.

For example, the selector 213 selects the printer 100 corresponding to the second number 312 or the third number 313, the serial number 310 closer to the first number 311, as the printer 100 from which the normal action log PLN is acquired. Note that the first number 311 is the serial number 310 of the first printer 100A, the second number 312 is the serial number 310 of the second printer 100B, and the third number 313 is the serial number 310 of the third printer 100C.

In other words, when the second number 312 is closer to the first number 311 than the third number 313, the selector 213 selects the second printer 100B as the printer 100 from which the normal action log PLN is acquired. When the third number 313 is closer to the first number 311 than the second number 312, the selector 213 selects the third printer 100C as the printer 100 from which the normal action log PLN is acquired.

Instead, for example, the selector 213 selects the printer 100 corresponding to the second model 322 or the third model 323, the model 320 closer to the first model 321, as the printer 100 from which the normal action log PLN is acquired. Note that the first model 321 is the model 320 of the first printer 100A, the second model 322 is the model 320 of the second printer 100B, and the third model 323 is the model 320 of the third printer 100C.

In other words, when the second model 322 is closer to the first model 321 than the third model 323, the selector 213 selects the second printer 100B as the printer 100 from which the normal action log PLN is acquired. When the third model 323 is closer to the first model 321 than the second model 322, the selector 213 selects the third printer 100C as the printer 100 from which the normal action log PLN is acquired.

Still instead, for example, the selector 213 selects the printer 100 corresponding to the second characteristic information JP2 or the third characteristic information JP3, the characteristic information JP containing a larger number of items common to those contained in the first characteristic information JP1, as the printer 100 from which the normal action log PLN is acquired. In this case, the first characteristic information JP1, the second characteristic information JP2, and the third characteristic information JP3 are each, for example, the set values 330, the print data 340, and the environmental information 350.

In other words, when the set values 330, the print data 340, and the environment information 350 contained in the second characteristic information JP2 are formed of a larger number of items common to the set values 330, the print data 340, and the environment information 350 contained in the first characteristic information JP1 than the set values 330, the print data 340, and the environment information 350 contained in the third characteristic information JP3, the selector 213 selects the second printer 100B as the printer 100 from which the normal action log PLN is acquired. When the set values 330, the print data 340, and the environment information 350 contained in the third characteristic information JP3 are formed of a larger number of items common to the set values 330, the print data 340, and the environment information 350 contained in the first characteristic information JP1 than the set values 330, the print data 340, and the environment information 350 contained in the second characteristic information JP2, the selector 213 selects the third printer 100C as the printer 100 from which the normal action log PLN is acquired.

The "common items" used herein mean items that constitute each of the set values 330, the print data 340, and the environment information 350 and are, for example, numerically close to each other.

For example, when the items are a set value VS, which is contained in the set values 330 and sets the conveyance speed of the recording medium M, and when Expression (1) below is satisfied, the selector 213 determines that the items are "common items".

$$(VS-VS1)/(VSX-VSN) \le THV \tag{1}$$

In Expression (1), the set value VS is a value that sets the conveyance speed of the recording medium M in the set values 330 contained in the second characteristic information JP2 or the third characteristic information JP3. The set value VS1 is a value that sets the conveyance speed of the recording medium M in the set values 330 contained in the first characteristic information JP1. The maximum VSX is a maximum conveyance speed in the printer 100. The minimum VSN is a minimum conveyance speed in the printer 100. The speed threshold THV is a threshold used to evaluate whether the set values of the conveyance speed of the recording medium M are "common items". The speed threshold THV is, for example, "0.05".

For example, when the items are a temperature T, which is contained in the environment information 350, at the location where the printer 100 is installed, and when Expression (2) below is satisfied, the selector 213 determines the items as "common items".

$$(T-T1)/(TX-TN) \le THT \tag{2}$$

In Expression (2), the temperature T is a parameter in the environment information 350 contained in the second characteristic information JP2 or the third characteristic information JP3 and is the temperature at the location where the printer 100 (second printer 100B or third printer 100C) is installed. The temperature T1 is a parameter in the environment information 350 contained in the first characteristic information JP1 and is the temperature at the location where the first printer 100A is installed. The maximum TX is a maximum temperature at the location where the printer 100 is installed. The maximum TX is, for example, 30° C. The minimum TN is a minimum temperature at the location where the printer 100 is installed. The minimum TN is, for example, 10° C. The temperature threshold THT is a threshold used to evaluate whether the temperatures at the location where the printers 100 are installed are "common items". The temperature threshold THT is, for example, "0.1".

When acquiring the error occurrence information ER, the second acquisition section 214 acquires the first action log PL1 showing the printing action of the first printer 100A, and the normal action log PLN showing the printing actions of other printers 100N that perform printing actions normally. In the present embodiment, the other printers 100N are the second printer 100B and the third printer 100C. The second acquisition section 214 causes the second log storage 219 to store the first action log PL1 and the normal action log PLN.

In other words, the second acquisition section 214 acquires the normal action log PLN from the printer 100 selected by the selector 213 from the second printer 100B and the third printer 100C as the printer 100 from which the normal action log PLN is acquired.

For example, when the selector 213 selects the second printer 100B as the printer 100 from which the normal action log PLN is acquired, the second acquisition section 214 carries out the process below. That is, the second acquisition section 214 acquires the first action log PL1 from the first printer 100A, and acquires the second action log PL2 as the normal action log PLN from the second printer 100B.

For example, when the selector 213 selects the third printer 100C as the printer 100 from which the normal action log PLN is acquired, the second acquisition section 214 carries out the process below. That is, the second acquisition section 214 acquires the first action log PL1 from the first printer 100A, and acquires the third action log PL3 as the normal action log PLN from the third printer 100C.

The comparator 215 compares the first action log PL1 with the normal action log PLN. The comparator 215 compares the first action log PL1 with the normal action log PLN for each of the items that constitute the action log PL. The comparator 215 extracts an item that constitutes the action log PL and has a significant difference between the first action log PL1 and the normal action log PLN.

When the items are numerically expressed, and satisfy, for example, Expression (3) below, the comparator 215 determines that the items are "items having a significant difference therebetween".

$$\Delta P/\Delta Q \ge THP \tag{3}$$

In Expression (3), the difference ΔP is the difference between the first action log PL1 and the normal action log PLN. The range ΔQ is the range of possible values of the items. In other words, the range ΔQ is the difference between the maximum of the possible values of the items and the minimum thereof. The threshold THP is a threshold used to evaluate whether the items are "items having a significant difference therebetween". The threshold THP is, for example, "0.5".

When the items are each an actually measured value of a control target, and satisfies, for example, Expression (4) below, the comparator 215 determines that the items are "items having a significant difference therebetween".

$$\Delta AC \geq THA \qquad (4)$$

In Expression (4), the control accuracy difference DAC is the difference between control accuracy AC1 contained in the first action log PL1 and control accuracy ACN contained in the normal action log PLN. The control accuracy threshold THA is a threshold used to evaluate whether the items are "items having a significant difference therebetween". The control accuracy threshold THA is, for example, "3%".

When the items are not expressed numerically, for example, when a condition for evaluation of whether the items are "items having a significant difference therebetween" is set in advance and the condition is satisfied, the comparator 215 determines that the items are "items having a significant difference therebetween".

Based on the result of the comparison performed by the comparator 215, the estimator 216 estimates an item relating to the error indicated by the error occurrence information ER out of the items contained in the first action log PL1. The item relating to the error indicated by the error occurrence information ER is a candidate of item that causes the error.

The estimator 216, for example, estimates the items extracted by the comparator 215 as "items having a significant difference therebetween" to be the item relating to the error indicated by the error occurrence information ER. The "items having a significant difference therebetween" are items having a significant difference between the first action log PL1 and the normal action log PLN out of the items that constitute the action log PL.

The second communication controller 217 receives the error occurrence information ER, the characteristic information JP, and the action log PL from the printer 100. Specifically, the second communication controller 217 acquires the error occurrence information ER, the first characteristic information JP1, and the first action log PL1 from the first printer 100A. The second communication controller 217 acquires the second characteristic information JP2 and the second action log PL2 from the second printer 100B. The second communication controller 217 further acquires the third characteristic information JP3 and the third action log PL3 from the third printer 100C.

4. Action Log

The action log PL will next be described with reference to FIG. 6. FIG. 6 is a table showing an example of the action log PL. The action log PL includes a sequence log 410, a memory log 420, a detail log 430, and a control-related memory log 440, as shown in FIG. 6.

The sequence log 410 is a log showing the action sequence of the printer 100. The memory log 420 and the control-related memory log 440 are each a log showing the control behavior of the printer 100.

The detail log 430 includes a proportional-integral-differential (PID) control log 431, an automatic tension control (ATC) log 432, a winding control log 433, a tension log 434, and a colorimetric adjustment log 435.

The PID control log 431 is a log showing the behavior of the PID control over the conveyance speed of the recording medium M conveyed by the conveyance rollers 105 and 106 of the printer 100. The ATC control log 432 is a log showing the behavior of the control over the tension applied to the recording medium M between the conveyance rollers 105 and 106. The winding control log 433 is a log showing the behavior of the control over the tension applied to the recording medium M between the relay roller 107 and the winding roller 108. The tension log 434 is a log showing the behavior of the tension applied to the recording medium M between the conveyance rollers 105 and 106. The colorimetric adjustment log 435 is a log showing the result of the adjustment made by the colorimeter 121.

Figure 6:
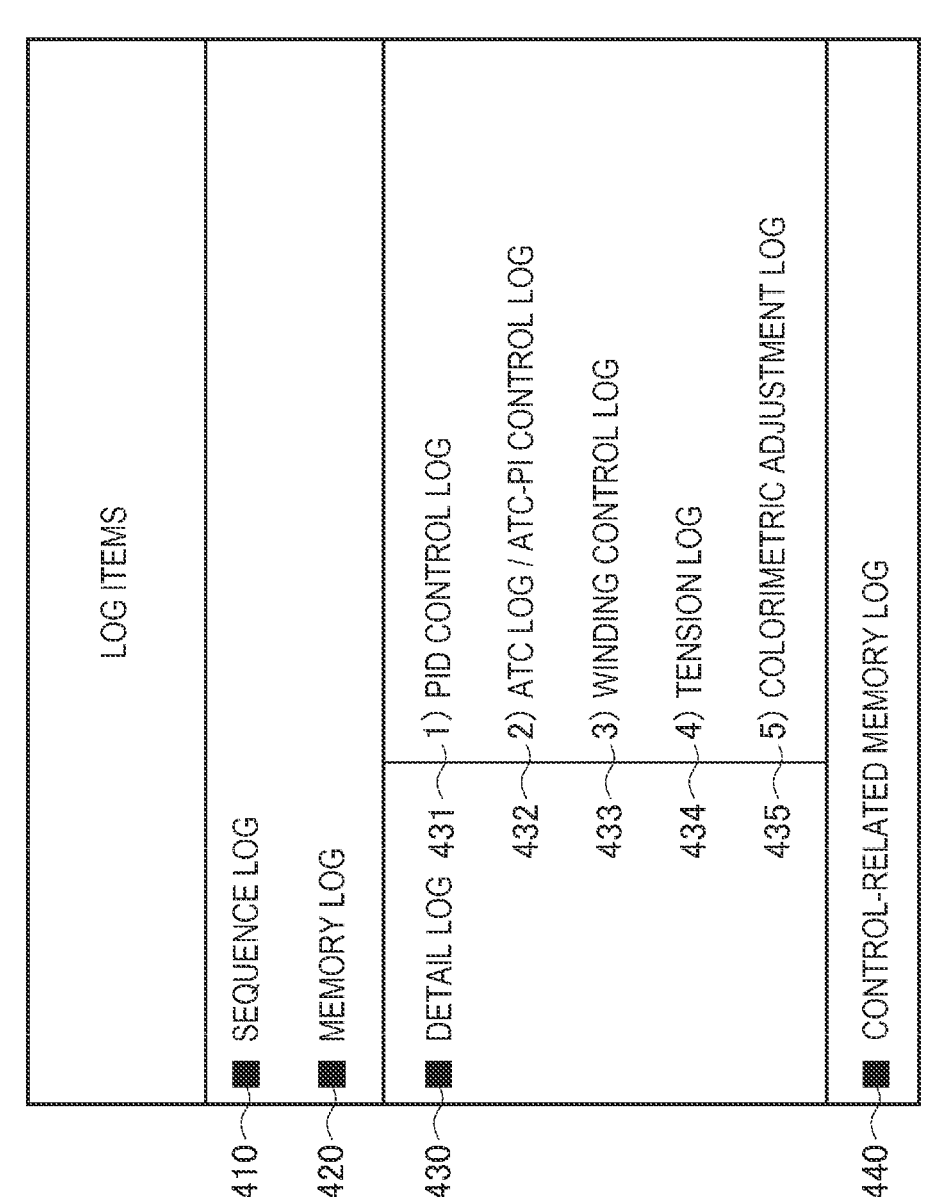
FIG. 6 is a table showing an example of an action log.

The action log PL includes the sequence log 410, the memory log 420, the detail log 430, and the control-related memory log 440, as shown in FIG. 6. The detail log 430 includes the PID control log 431, the ATC log 432, the winding control log 433, the tension log 434, and the colorimetric adjustment log 435. Therefore, based on the result of the comparison performed by the comparator 215, the estimator 216 can estimate an error causing item out of the items contained in the first action log PL1.

The present embodiment has been described with reference to the case where the action log PL includes, as the detail log 430, the PID control log 431, the ATC log 432, the winding control log 433, the tension log 434, and the colorimetric adjustment log 435, but not necessarily. The first action log PL1 may include, as the detail log 430, other logs in addition to the PID control log 431, the ATC log 432, the winding control log 433, the tension log 434, and the colorimetric adjustment log 435. The content of a log to be acquired as the action log PL may be set in the printer 100 via the server apparatus 200 by the user (designer of printer 100, and person in charge of maintenance of printer 100, for example). In this case, the user's convenience can be improved.

The present embodiment has been described with reference to the case where the action log PL includes the sequence log 410, the memory log 420, the detail log 430, and the control-related memory log 440, but not necessarily. The action log PL only needs to include at least the sequence log 410, the memory log 420, and the control-related memory log 440. The reason for this is that the sequence log 410, the memory log 420, and the control-related memory log 440 provide an overview of the behavior of the printer 100.

5. Processes Carried Out by Controllers

Figure 7:
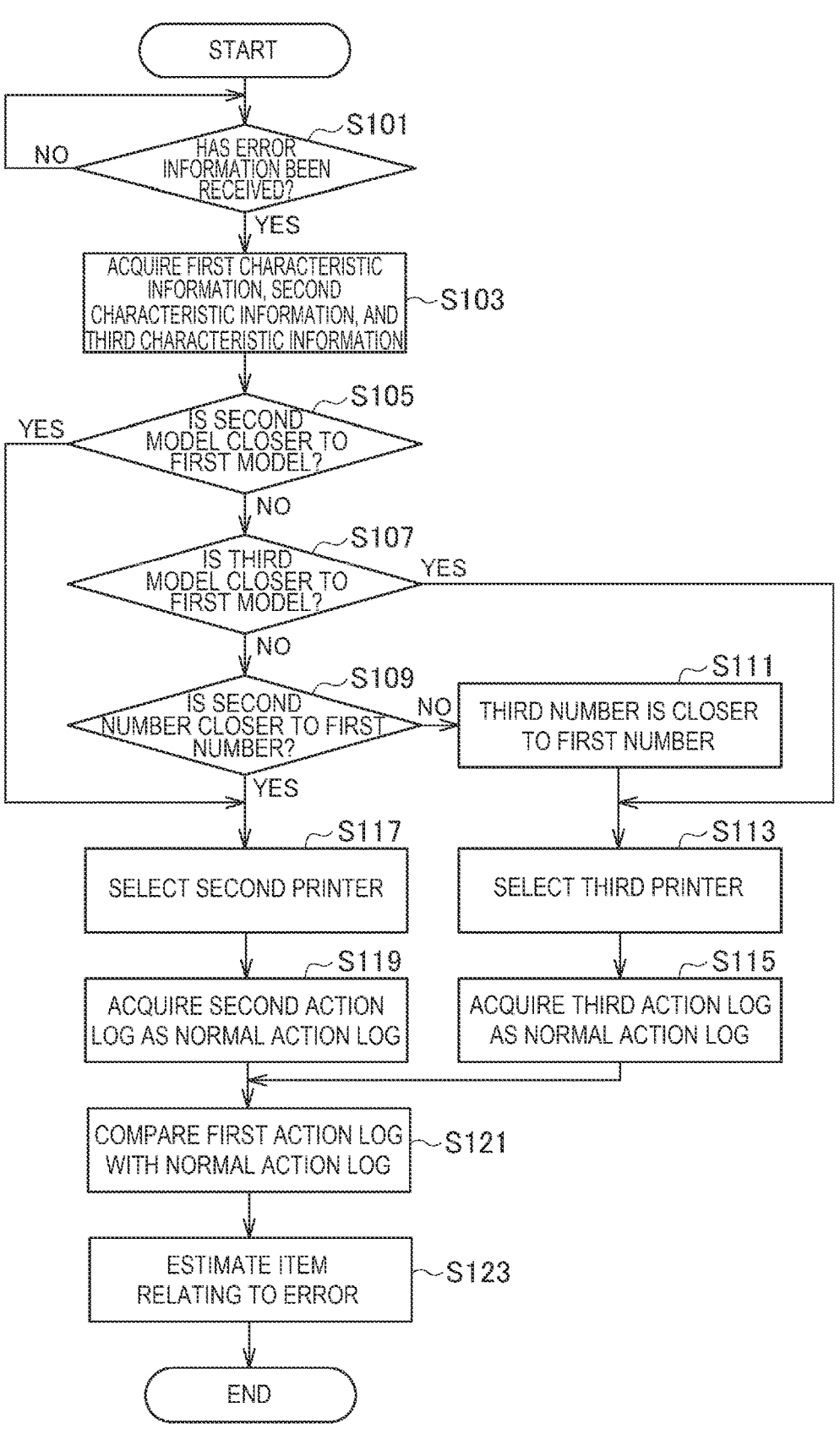
FIG. 7 is a flowchart showing an example of the processes carried out by the server apparatus.

The processes carried out by the second controller 210 of the server apparatus 200 will next be described with reference to FIG. 7. FIG. 7 is a flowchart showing an example of the processes carried out by the server apparatus 200.

The description with reference to FIG. 7 relates to a case where the selector 213 selects the printer 100 from which the normal action log PLN is acquired from the second printer 100B and the third printer 100C based on the serial number 310 and the model 320.

First, in step S101, the first acquisition section 211 evaluates whether the error occurrence information ER has been acquired from the first printer 100A, as shown in FIG. 7.

When the first acquisition section 211 determines that the error occurrence information ER has not been acquired (NO in step S101), the first acquisition section 211 transitions to an idle state. When the first acquisition section 211 determines that the error occurrence information ER has been acquired (YES in step S101), the first acquisition section 211 proceeds to the process in S103.

Thereafter, in step S103, the third acquisition section 212 acquires the first characteristic information JP1 from the first printer 100A, acquires the second characteristic information JP2 from the second printer 100B, and acquires the third characteristic information JP3 from the third printer 100C.

Thereafter, in step S105, the selector 213 evaluates whether the second type 322 is closer to the first type 321 than the third type 323. Note that the first model 321 is the model 320 of the first printer 100A, the second model 322 is the model 320 of the second printer 100B, and the third model 323 is the model 320 of the third printer 100C.

When the selector 213 determines that the second type 322 is closer to the first type 321 than the third type 323 (YES in step S105), the selector 213 proceeds to the process in S117. When the selector 213 determines that the second type 322 is not closer to the first type 321 than the third type 323 (NO in step S105), the selector 213 proceeds to the process in S107.

Thereafter, in step S107, the selector 213 evaluates whether the third type 323 is closer to the first type 321 than the second type 322.

When the selector 213 determines that the third type 323 is closer to the first type 321 than the second type 322 (YES in step S107), the selector 213 proceeds to the process in S113. When the selector 213 determines that the third type 323 is not closer to the first type 321 than the second type 322 (NO in step S107), the selector 213 proceeds to the process in S109. For example, when the second type 322 and third type 323 are each the same type as the first type 321, the selector 213 proceeds to the process in S109.

Thereafter, in step S109, the selector 213 evaluates whether the second number 312 is closer to the first number 311 than the third number 313. The first number 311 is the serial number 310 of the first printer 100A. The second number 312 is the serial number 310 of the second printer 100B. The third number 313 is the serial number 310 of the third printer 100C.

When the selector 213 determines that the second number 312 is closer to the first number 311 than the third number 313 (YES in step S109), the selector 213 proceeds to the process in S117. When the selector 213 determines that the second number 312 is not closer to the first number 311 than the third number 313 (NO in step S109), the selector 213 proceeds to the process in S111.

Thereafter, in step S111, the selector 213 determines that the third number 313 is closer to the first number 311 than the second number 312.

Thereafter, in step S113, the selector 213 selects the third printer 100C as the printer 100 from which the normal action log PLN is acquired.

Thereafter, in step S115, the second acquisition section 214 acquires the third action log PL3 as the normal action log PLN from the third printer 100C. The second acquisition section 214 then proceeds to the process in S121.

When the result of the evaluation in step S105 is YES, or when the result of the evaluation in step S109 is YES, the selector 213 selects in step S117 the second printer 100B as the printer 100 from which the normal action log PLN is acquired.

Thereafter, in step S119, the second acquisition section 214 acquires the second action log PL2 as the normal action log PLN from the second printer 100B.

Thereafter, in step S121, the comparator 215 compares the first action log PL1 with the normal action log PLN.

Thereafter, in step S123, based on the result of the comparison performed by the comparator 215, the estimator 216 estimates an item relating to the error indicated by the error occurrence information ER out of the items contained in the first action log PL1. The processes are then terminated.

Step S101 corresponds to an example of a "first acquisition step". Steps S115 and S119 correspond to an example of a "second acquisition step". Step S121 corresponds to an example of a "comparison step". Step S123 corresponds to an example of an "estimation step".

The description with reference to FIG. 7 relates to a case where the selector 213 selects, based on the serial number 310 and the model 320, the printer 100 from which the normal action log PLN is acquired from the second printer 100B and the third printer 100C, but not necessarily.

Based on the first characteristic information JP1, the second characteristic information JP2, and the third characteristic information JP3, the selection section 213 may select the printer 100 from which the second acquisition section 214 acquires the normal action log PLN from the second printer 100B and the third printer 100C.

For example, based on the set values 330, the print data 340, and the environment information 350 contained in the characteristic information JP, the selection section 213 may select the printer 100 from which the second acquisition section 214 acquires the normal action log PLN from the second printer 100B and the third printer 100C. For example, the selector 213 selects the printer 100 corresponding to the second characteristic information JP2 or the third characteristic information JP3, the characteristic information JP containing a larger number of items common to those contained in the first characteristic information JP1, as the printer 100 from which the normal action log PLN is acquired.

6. Configurations and Effects

As described above, the server apparatus 200 according to the present embodiment is the server apparatus 200 connected to the printer 100 in a communicable manner. The printer 100 includes the first printer 100A and the other printers 100N, and the server apparatus 200 includes the first acquisition section 211, which, when an error occurs in the first printer 100A, acquires the error occurrence information ER indicating that the error has occurred from the first printer 100A, the second acquisition section 214, which, when the error occurrence information ER is acquired, acquires the first action log PL1 indicating the printing action of the first printer 100A and the normal action log PLN indicating the printing actions of the other printers 100N, which perform the printing action normally, the comparator 215, which compares the first action log PL1 with the normal action log PLN, and the estimator 216, which estimates an item relating to the error from the items contained in the first action log PL1 based on the result of the comparison performed by the comparator 215.

According to the configuration described above, the first action log PL1 is compared with the normal action log PLN, and based on the result of the comparison, an item relating to the error is estimated out of the items contained the first action log PL1.

Therefore, the first action log PL1 is compared with the normal action log PLN, whereby an item relating to the error can be properly estimated out of the items contained the first action log PL1. An item that causes the error can therefore be estimated.

The other printers 100N include the second printer 100B and the third printer 100C, and the server apparatus 200 further includes the third acquisition section 212, which, when the error occurrence information ER is acquired, acquires the first characteristic information JP1 indicating the characteristics of the first printer 100A, the second characteristic information JP2 indicating the characteristics of the second printer 100B, and the third characteristic information JP3 indicating the characteristics of the third printer 100C, and the selector 213, which selects the printer 100 from which the normal action log PLN is acquired from the second printer 100B and the third printer 100C based on the first characteristic information JP1, the second characteristic information JP2, and the third characteristic information JP3.

According to the configuration described above, based on the first characteristic information JP1, the second characteristic information JP2, and the third characteristic information JP3, the printer 100 from which the normal action log PLN is acquired is selected from the second printer 100B and the third printer 100C.

Properly setting the items that constitute each of the first characteristic information JP1, the second characteristic information JP2, and the third characteristic information JP3 therefore allows proper selection of the printer 100 from which the normal action log PLN is acquired. A proper normal action log PLN can therefore be acquired.

The first characteristic information JP1, the second characteristic information JP2, and the third characteristic information JP3 each contain at least one of the serial number 310 of the printer 100, the model 320 of the printer 100, the set values 330 for the printer 100, the print data 340 representing an image to be printed by the printer 100, and the environment information 350 representing the environment in which the printer 100 is installed.

According to the configuration described above, the first characteristic information JP1, the second characteristic information JP2, and the third characteristic information JP3 each contain at least one of the serial number 310 of the printer 100, the model 320 of the printer 100, the set values 330 for the printer 100, the print data 340 representing an image to be printed by the printer 100, and the environment information 350 representing the environment in which the printer 100 is installed.

A printer 100 from which the normal action log PLN is acquired can therefore be properly selected. A proper normal action log PLN can therefore be acquired.

The first characteristic information JP1, the second characteristic information JP2, and the third characteristic information JP3 each contain the serial number 310 of the printer 100, and the selector 213 selects, as the printer 100 from which the normal action log PLN is acquired, the printer 100 having a serial number closer to the serial number 310 (first number 311) of the first printer 100A out of the serial number 310 (second number 312) of the second printer 100B and the serial number 310 (third number 313) of the third printer 100C.

According to the configuration described above, a printer 100 having a serial number closer to the first number 311 out of the second number 312 and the third number 313, is selected as the printer 100 from which the normal action log PLN is acquired.

The printer 100 having a serial number 310 close to the first number 311 is therefore selected as the printer 100 from which the normal action log PLN is acquired, whereby the printer 100 from which the normal action log PLN is acquired can be properly selected. A proper normal action log PLN can therefore be acquired.

The first characteristic information JP1, the second characteristic information JP2, and the third characteristic information JP3 each contain the model 320 of the printer 100, and the selector 213 selects, as the printer 100 from which the normal action log PLN is acquired, the printer 100 having a model closer to the model 320 (first model 321) of the first printer 100A out of the model 320 (second model 322) of the second printer 100B and the model 320 (third model 323) of the third printer 100C.

According to the configuration described above, a printer 100 having a model closer to the first model 321 out of the second model 322 and the third model 323 is selected as the printer 100 from which the normal action log PLN is acquired.

The printer 100 having a model 320 close to the first model 321 is therefore selected as the printer 100 from which the normal action log PLN is acquired, whereby the printer 100 from which the normal action log PLN is acquired can be properly selected. A proper normal action log PLN can therefore be acquired.

The first characteristic information JP1, the second characteristic information JP2, and the third characteristic information JP3 each contain at least one of the set values 330 for the printer 100, the print data 340 representing an image to be printed by the printer 100, and the environment information 350 representing the environment in which the printer 100 is installed, and the selector 213 selects the printer 100 corresponding to the second characteristic information JP2 or the third characteristic information JP3, the characteristic information JP containing a larger number of items common to those contained in the first characteristic information JP1, as the printer 100 from which the normal action log PLN is acquired.

According to the configuration described above, the printer 100 corresponding to the second characteristic information JP2 or the third characteristic information JP3, the characteristic information JP containing a larger number of items common to those contained in the first characteristic information JP1, is selected as the printer 100 from which the normal action log PLN is acquired.

The printer 100 corresponding to the characteristic information containing a larger number of items common to those contained in the first characteristic information JP1 is therefore selected as the printer 100 from which the normal action log PLN is acquired, whereby the printer 100 from which the normal action log PLN is acquired can be properly selected. A proper normal action log PLN can therefore be acquired.

The method for controlling the server apparatus 200 according to the present embodiment is a method for controlling the server apparatus 200 connected to the printer 100 in a communicable manner, the printer 100 including the first printer 100A and the other printers 100N, the method including a first acquisition step of acquiring, when an error occurs in the first printer 100A, the error occurrence information ER indicating that the error has occurred from the first printer 100A, a second acquisition step of acquiring, when the error occurrence information ER is acquired, the first action log PL1 indicating the printing action of the first printer 100A, and the normal action log PLN indicating printing actions of the other printers 100N, which perform the printing normally, a comparison step of comparing the first action log PL1 with the normal action log PLN, and an estimation step of estimating an item relating to the error from the items contained in the first action log PL1 based on the result of the comparison in the comparison step.

The method for controlling the server apparatus 200 according to the present embodiment provides the same effects and advantages as those provided by the server apparatus 200 according to the present embodiment.

The printing system 1 according to the present embodiment is the printing system 1 including the printer 100 and the server apparatus 200 connected to the printer 100 in a communicable manner, the printer 100 including the first printer 100A and the other printers 100N, the server apparatus 200 including the first acquisition section 211, which acquires, when an error occurs in the first printer 100A, the error occurrence information ER indicating that the error has occurred from the first printer 100A, the second acquisition section 214, which acquires, when the error occurrence information ER is acquired, the first action log PL1 indicating the printing action of the first printer 100A, and the normal action log PLN indicating the printing actions of the other printers 100N, which perform the printing normally, the comparator 215, which compares the first action log PL1 with the normal action log PLN, and the estimator 216, which estimates an item relating to the error from the items contained in the first action log PL1 based on the result of the comparison performed by the comparator 215.

The printing system 1 according to the present embodiment provides the same effects and advantages as those provided by the server apparatus 200 according to the present embodiment.

7. Other Embodiments

The embodiment described above is an example of an aspect of the present disclosure, and can be changed and applied in any manner to the extent that the changes and applications do not depart from the intent of the present disclosure.

The present embodiment has been described with reference to the case for convenience where the printing system 1 includes three printers 100, but not necessarily. The printing system 1 may include four or more printers 100.

The present embodiment has been described with reference to the case where the other printers 100N include the second printer 100B and the third printer 100C, but not necessarily. The other printers 100N may include three or more printers 100.

The present embodiment has been described with reference to the case where the printer 100 is a large-format inkjet printer, and may instead be what is called a business printer or a home printer.

The present embodiment has been described with reference to the case where the "information processing apparatus" is the server apparatus 200, but not necessarily. The "information processing apparatus" may, for example, be a personal computer, a table terminal, or a smartphone.

The present embodiment has been described with reference to the case where the characteristic information JP contains the serial number 310, the model 320, the set values 330, the print data 340, and the environment information 350, but not necessarily. The characteristic information JP only needs to contain at least one of the serial number 310, the model 320, the set values 330, the print data 340, and the environment information 350. For example, the characteristic information JP may be formed of the serial number 310 and the model 320. Instead, for example, the characteristic information JP may be formed of the set values 330, the print data 340, and the environment information 350. Still instead, the characteristic information JP may contain, for example, the action log PL.

The process units in the flowchart shown in FIG. 7 are process units into which the process carried out by the second controller 210 of the server apparatus 200 is divided in accordance with the primary processing content for easy understanding of the process. How to produce the divided process units or the names of the process units do not limit the present disclosure. The process may be divided into a larger number of process units in accordance with the content of the process. The process units may each be further divided into a large number of processes. The sequence of the processes may be changed as appropriate to the extent that the changed order does not contradicts the intent of the present disclosure.

The functional portions shown in FIGS. 3 and 4 each represent a functional configuration and is not necessarily implemented in a specific form. That is, hardware corresponding to each of the functional portions is not necessarily implemented, and a single processor that executes a program can achieve the functions of the plurality of functional portions. Furthermore, part of the functions achieved by software in the embodiment described above may be achieved by hardware, or part of the functions achieved by hardware in the embodiment described above may be achieved by software. In addition, the specific detailed configuration of each of the other portions of the printer 100 and the server apparatus 200 can be changed in any manner to the extent that the change does not depart from the intent of the present disclosure.

The functional blocks of the second controller 210 of the server apparatus 200 shown in FIG. 4 can be achieved by causing the second processor 210A provided in the second controller 210 of the server apparatus 200 to execute the second control program PG2 stored in the second memory 210B. The second control program PG2 can also be recorded on a computer readable recording medium.

The recording medium can be a magnetic or optical recording medium or a semiconductor memory device. Specific examples of the recording medium may include a flexible disk, an HDD (hard disk drive), a CD-ROM (compact disk read only memory), a DVD (digital versatile disc), a Blu-ray (registered trademark) disc, a magneto-optical disk, a flash memory, and a portable or immobile recording medium such as a card-shaped recording medium. The recording medium may instead be a RAM, a ROM, an HDD, or any other nonvolatile storage device that is an internal storage device provided in the second controller 210 of the server apparatus 200. The functional blocks of the second controller 210 of the server apparatus 200 can still instead be achieved by storing the second control program PG2, for example, in another server apparatus and downloading the second control program PG2 from the other server apparatus to the second controller 210 of the server apparatus 200.

What is claimed is:

1. An information processing apparatus connected to a plurality of printing apparatuses in a communicable manner,
   the plurality of printing apparatuses including a first printing apparatus and, a second printing apparatus, and a third printing apparatus,
   the information processing apparatus comprising:
   a first acquisition section that is configured to, when an error occurs in the first printing apparatus, acquire error occurrence information indicating that the error occurred from the first printing apparatus;
   a second acquisition section that is configured to, in response to the acquiring of the error occurrence information indicating that the error has occurred from the first printing apparatus, acquire a first action log indicating a printing action of the first printing apparatus and a normal action log indicating a printing action of the second printing apparatus, which performs the printing action normally;
   a comparator configured to compare the first action log with the normal action log;

an estimator configured to estimate an item relating to the error that occurred in the first printing apparatus from items contained in the first action log based on a result of the comparison performed by the comparator;

a third acquisition section that is configured to, in response to the acquiring of the error occurrence information indicating that the error has occurred from the first printing apparatus, acquires first characteristic information indicating characteristics of the first printing apparatus, second characteristic information indicating characteristics of the second printing apparatus, and third characteristic information indicating characteristics of the third printing apparatus, and a selector that is configured to select the second printing apparatus from which the normal action log is acquired based on the first characteristic information, the second characteristic information, and the third characteristic information, wherein the first characteristic information, the second characteristic information, and the third characteristic information each contain environment information representing an environment in which the printing apparatus is installed.

2. The information processing apparatus according to claim 1, wherein the first characteristic information, the second characteristic information, and the third characteristic information each contain at least one of a serial number of the printing apparatus, a model of the printing apparatus, a set value for the printing apparatus, and print data representing an image to be printed by the printing apparatus.

3. The information processing apparatus according to claim 2, wherein the selector is configured to select from the second printing apparatus and the third printing apparatus, as the printing apparatus from which the normal action log is acquired, based on which of the second and third printing apparatuses has characteristic information containing a larger number of items common to the items contained in the first characteristic information.

4. A method for controlling an information processing apparatus connected to a plurality of printing apparatuses in a communicable manner, the plurality of printing apparatuses including a first printing apparatus, a second printing apparatus and a third printing apparatus, the method comprising:

acquiring error occurrence information indicating that the error occurred from the first printing apparatus;

in response to the acquiring of the error occurrence information indicating that the error has occurred from the first printing apparatus, performing the following:

acquiring a first action log indicating a printing action of the first printing apparatus;

acquiring first characteristic information indicating characteristics of the first printing apparatus, second characteristic information indicating characteristics of the second printing apparatus, and third characteristic information indicating characteristics of the third printing apparatus;

selecting the second printing apparatus from which a normal action log is to be acquired based on the first characteristic information, the second characteristic information, and the third characteristic information; and , in respect to the selection, acquiring the normal action log indicating a printing action of the second printing apparatus, which performs the printing action normally;

comparing the first action log with the normal action log; and estimating an item relating to the error that occurred in the first printing apparatus from items contained in the first action log based on a result of the comparison in the comparison of the first action log with the normal action log, wherein the first characteristic information, the second characteristic information, and the third characteristic information each contain environment information representing an environment in which the printing apparatus is installed.

5. A printing system comprising:

a plurality of printing apparatuses; and an information processing apparatus connected to the plurality of printing apparatuses in a communicable manner, wherein the plurality of printing apparatuses includes a first printing apparatus, a second printing apparatus, and a third printing apparatus, and the information processing apparatus includes a first acquisition section that is configured to, when an error occurs in the first printing apparatus, acquire error occurrence information indicating that the error occurred from the first printing apparatus, a second acquisition section that is configured to, in response to the acquiring of the error occurrence information indicating that the error has occurred from the first printing apparatus, acquire a first action log indicating a printing action of the first printing apparatus and a normal action log indicating a printing action of the second printing apparatus, which performs the printing action normally, a comparator that is configured to compare the first action log with the normal action log, an estimator that is configured to estimate an item relating to the error that occurred in the first printing apparatus from items contained in the first action log based on a result of the comparison performed by the comparator;

a third acquisition section that is configured to, in response to the acquiring of the error occurrence information indicating that the error has occurred from the first printing apparatus, acquire first characteristic information indicating characteristics of the first printing apparatus, second characteristic information indicating characteristics of the second printing apparatus, and third characteristic information indicating characteristics of the third printing apparatus, and a selector that is configured to select the second printing apparatus from which the normal action log is acquired based on the first characteristic information, the second characteristic information, and the third characteristic information, wherein the first characteristic information, the second characteristic information, and the third characteristic information each contain environment information representing an environment in which the printing apparatus is installed.

* * * * *